Oct. 12, 1965  F. P. DANIELS, JR  3,210,867
TREE BALLING MACHINE WITH EXCAVATING MEANS COMPRISING
A DOWNWARD PRESSURE COMPONENT AND A
HORIZONTALLY ROCKING COMPONENT
Filed Dec. 13, 1962  2 Sheets-Sheet 2
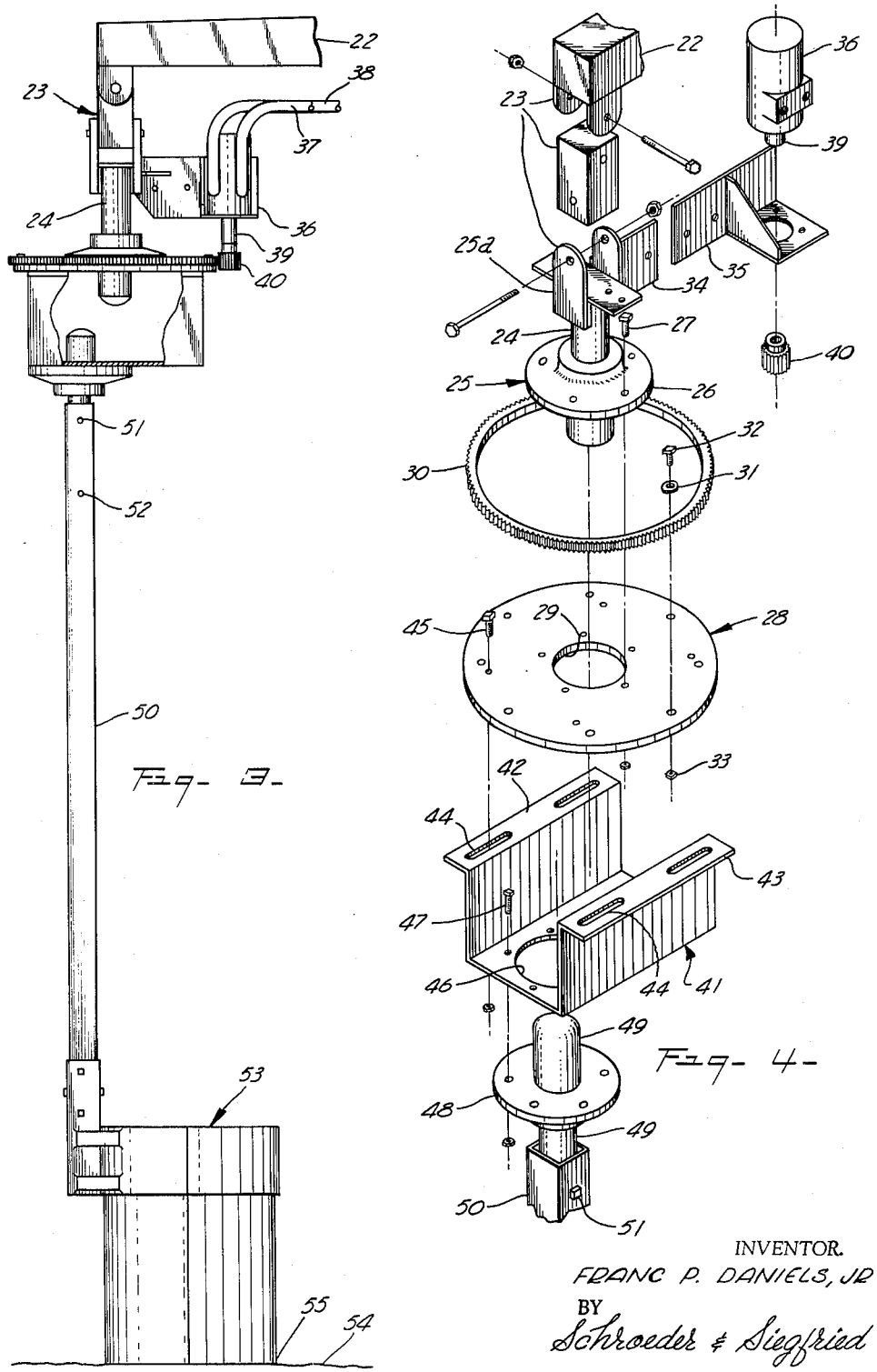
INVENTOR.
FRANC P. DANIELS, JR
BY
Schroeder & Siegfried
ATTORNEYS

United States Patent Office 3,210,867
Patented Oct. 12, 1965

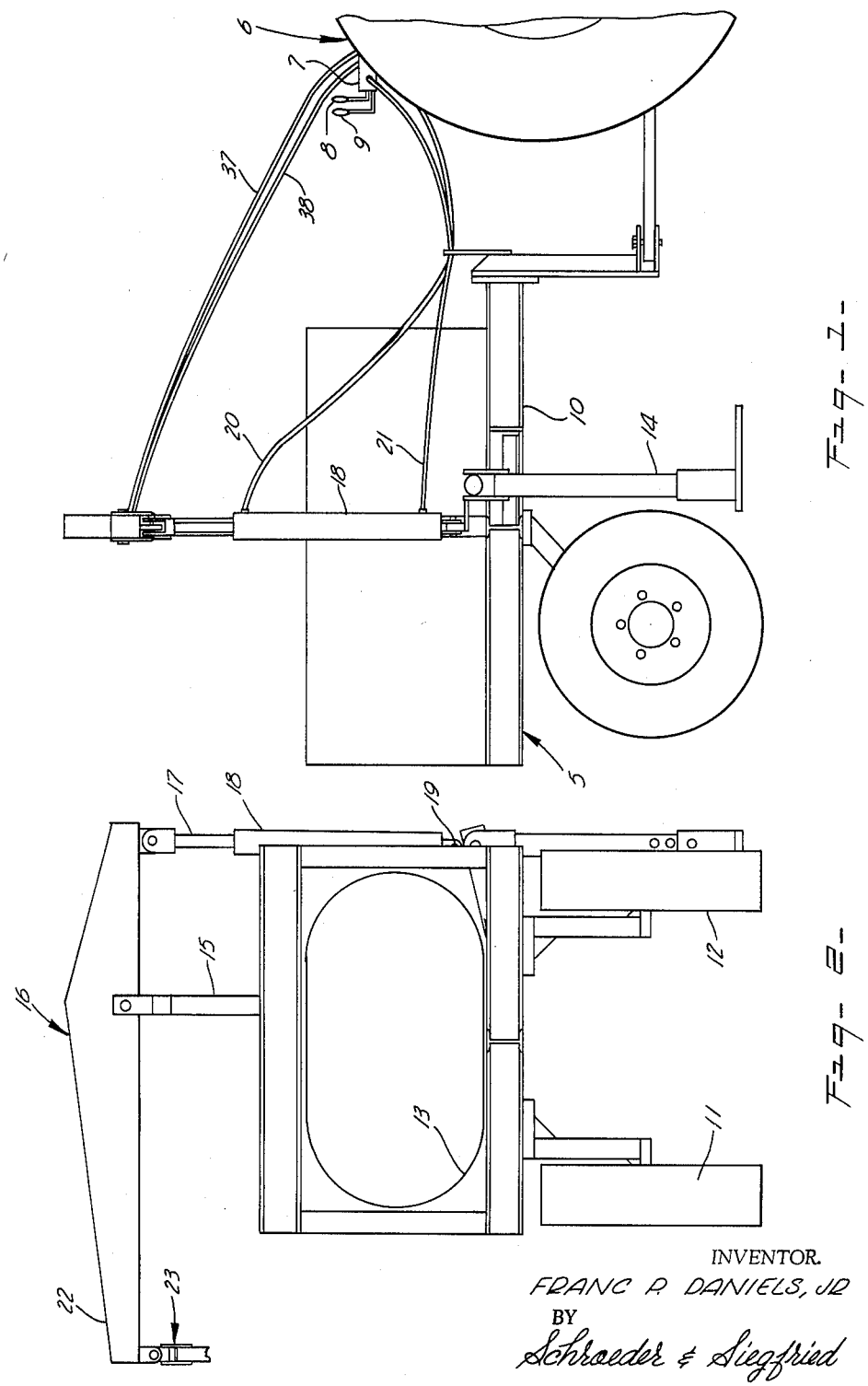

3,210,867
TREE BALLING MACHINE WITH EXCAVATING MEANS COMPRISING A DOWNWARD PRESSURE COMPONENT AND A HORIZONTALLY ROCKING COMPONENT
Franc P. Daniels, Jr., Rockford, Minn.
Filed Dec. 13, 1962, Ser. No. 244,356
17 Claims. (Cl. 37—2)

This invention relates to tree balling machines. More particularly, it relates to a tree balling device designed to permit a high degree of flexibility with respect to tree location relative to the machine and to greatly facilitate the act of digging and balling such a tree.

The invention disclosed and claimed herein constitutes an improvement on my tree balling machine which is disclosed and claimed in my U.S. Letters Patent No. 2,964,860. While the tree balling machine disclosed in said patent is very effective and constitutes a great improvement over tree balling devices previously known, I have found that the advantages of such a device can be substantially increased by the inclusion of the additional features disclosed herein so as to greatly facilitate the tree balling operation under substantially all conditions of the fields in which the trees are grown.

As pointed out in my above Patent No. 2,964,860, there is a substantial need for a device or machine which can quickly and easily remove small trees from the soil in which they are grown with the roots and the soil surrounding the same being substantially intact in a single ball. The operation of such a device is commonly referred to as "balling." Usually, the ball of earth and the tree surrounded by the same after having been removed from the field in which it is grown is subsequently placed in a cardboard tub or wrapped in kraft paper or burlap. My machine as disclosed and climed in my prior Patent No. 2,964,860 does an excellent job of cutting through the surrounding soil at points spaced from the tree trunk or stem so as to maintain root damage at a minimum. The power required for forcing the balling band of this machine straight downwardly into the soil, however, is quite substantial in some types of soil. I have developed a novel means for facilitating the insertion of the balling band into the soil around the tree to the desired depth and consequently effecting a substantial reduction in the power requirements and greatly facilitating the insertion of the balling band. In addition, my balling machine as shown in my prior patent is limited as to flexibility with respect to the location of the tree to the vehicle and this creates a problem in that young trees are frequently somewhat displaced out of line during the cultivation operation with the result that they are not truly aligned when they reach the age for transplanting, thereby making it difficult for a vehicle traveling down a row of trees to dig and ball the tree while maintaining the tree centered with respect to the balling band. My machine as disclosed herein overcomes each of these disadvantages.

It is a general object of my invention to provide a novel and improved balling machine of simple and inexpensive construction and operation.

A more specific object is to provide a novel and improved tree balling machine constructed and designed to greatly facilitate the insertion of the tree balling band into the soil to the desired depth.

Another object is to provide a novel and improved tree balling machine having substantially less power requirements for driving the balling band into the soil surrounding the tree to be balled.

Another object is to provide a novel and improved tree balling machine having novel means for rocking the balling band while it is being pressed downwardly into the soil to thereby greatly facilitate the insertion of the balling band.

Another object is to provide a novel and improved tree balling machine having novel rotary drive means connected to the balling band support for displacing the axis of the support member from a vertical axis extending through the support member at its point of connection with the balling band.

Another object is to provide novel and improved tree balling mechanisms constructed and designed to greatly facilitate the insertion of the balling band by rocking the same while transmitting downwardly directed pressure thereto and also being capable of substantial flexibility with respect to the location of the tree to be balled relative to the vehicle.

Another object is to provide a novel and improved tree balling machine utilizing a universal coupling to support the pressure transmitting member which carries the balling band and also utilizes rocking means interposed between the coupling and the pressure transmitting member to cause the balling band to be rocked as it is pressed downwardly into the soil.

Another object is to provide a novel and improved tree balling machine utilizing solely hydraulic power for providing the downwardly directed pressure transmitted to the balling band and for driving revolver mechanism connected to the pressure transmitting member to move the upper portions of the pressure transmitting member in an arcuate path around a vertical axis extending through the point of connection of that member with the balling band to thereby greatly facilitate the insertion of the balling band into the soil.

These and other objects and advangtages of my invention will more fully appear from the following description, made in connection with the accompanying drawings, wherein like reference characters refer to the same or similar parts throughout the several views, and in which:

FIG. 1 is a diagrammatic side elevational view of a vehicle carrying one of my tree balling mechanisms and drawn by a tractor which is shown fragmentarily.

FIG. 2 is a diagrammatic rear end elevational view showing the transverse rocker arm at the upper end of the same vehicle and having the remainder of the digging apparatus broken away at the left end of the rocket arm.

FIG. 3 is an elevational view of the remainder of the tree balling mechanism not shown in FIGS. 1 and 2 with the rocker arm and a mounting bracket broken away, all shown on an enlarged scale.

FIG. 4 is an exploded view of the balling band supporting and rocking mechanism with the balling band and its support member broken away, all on a still larger scale.

One embodiment of my invention as shown in FIGS. 1–4, inclusive, includes a wheeled vehicle 5 which may be drawn by a tractor 6 carrying a source of hydraulic pressure indicated generally at 7. Such a source of hydraulic pressure may, as is conventional, include a hydraulic pump and reservoir (not shown). Controls indicated by the numerals 8 and 9 are provided for supplying or connecting the hydraulic pressure to the various hydraulic means to be hereinafter described.

The vehicle 5 includes a frame 10 which is rigid and is supported by a pair of wheels 11 and 12. A water tank 13 is carried by the vehicle to provide ballast. A brace member 14 is carried at one side of the vehicle to aid in preventing the vehicle from tipping sidways when the balling operation is effected.

Mounted upon the frame 10 is an upstanding mounting post 15 which pivotally supports an elongated rocker arm 16 that extends transversely of the frame of the vehicle and is utilized to transmit downwardly directed pressure to the remainder of the balling mechanism. Drive means for the rocker arm 16 include a hydraulic piston 17 that is pivotally connected to the shorter end of the rocker arm 16, as shown in FIG. 2, and a vertically extending hydraulic cylinder 18. This cylinder 18 is pivotally connected to the frame 10 as at 19 and is connected by hydraulic lines 20 and 21 to the source of hydraulic pressure 7, as best shown in FIG. 1. It will be noted that the hydraulic line 20 is connected to the upper end of the vertically extending cylinder 18 while the hydraulic line 21 is connected to the lower end thereof so as to drive the piston rod 17 in opposite directions as desired.

Mounted upon the outer end portion or thrust-transmitting portion 22 of the rocker arm 16 is a universal coupling indicated generally by the numeral 23. The details of this universal coupling can best be seen in FIGS. 3 and 4. As best shown in FIG. 4, this universal coupling is rigid so as to be capable of transmitting pressure in a downward direction despite its universal movement ability. A shaft 24 having a yoke 25a at its upper end is secured pivotally to the thrust-transmitting portion 22 of the rocker arm 16 by the universal coupling 23. This shaft 24 is rotatably mounted within a bearing member 25 for rotation about the longitudinal axis of the shaft. The bearing member 25 includes an outwardly extending flange 26 which is bolted by bolts 27 to a circular disc member 28 through holes provided for that purpose in the disc. This disc 28 has a centrally disposed opening 29 through which the lower end portion of the shaft 24 extends to mount the balling band and its supporting push rod as will be hereinafter explained.

Superimposed upon the peripheral portions of the disc 28 is a ring gear 30. This ring gear is secured to the disc 28 by a plurality of washers 31 through which bolts 32 extend into the peripheral portions of the disc 28 as best shown in FIG. 4. These washers overlap the ring gear 30 so that when the bolts 32 are secured by nuts 33, the washers 31 positively clamp the ring gear 30 to the peripheral portions of the disc 28.

Mounted upon the yoke 25a is a laterally extending bracket 34. This bracket 34 supports a mounting bracket 35 which in turn carries a hydraulic motor 36 that is connected by a pair of hydraulic lines 37 and 38 to the source of hydraulic pressure 7. The drive shaft 39 of the hydraulic motor 36 carries a drive pinion 40 which is positioned so that the teeth thereof engage the teeth of the ring gear 30 to positively drive the same when the hydraulic motor 36 is driven, thereby causing the disc member 28 to rotate about the longitudinal axis of the shaft 24, turning the disc 28 and the supporting bearing 25 therewith. The ring gear 30 and the drive pinion 40 together constitute rotary drive mechanism for the support member 28 to cause such rotation. Adjustably secured to the underside of the support disc 28 is a mounting bracket 41. As best shown in FIG. 4, this mounting bracket is generally U-shaped in cross-section and is provided with a pair of outwardly extending lateral flanges 42 and 43 in which elongated slots such as indicated by the numeral 44 are formed. These slots 44 accommodate bolts 45 which secure the bracket to the underside of the disc 28 but permit shifting movement of the bracket radially of the disc when the same is desired by merely loosening the bolts 45. An opening 46 is formed in the bottom of the bracket 41, this opening being displaced toward one end of the bracket as best shown in FIG. 4 and being vertically offset relative to the center of the opening 29 of the disc 28.

Secured to the underside of the bracket 41 by bolts 47 is a bearing 48 which rotatably supports a shaft 49. The shaft 49 extends upwardly through the opening 46 and rotates about its longitudinal axis relative to the bearing 48 and the bracket 41. Thus the mounting bracket 41 and the support disc 28 supports the shaft 49 which is carried by the bearing 48. The pressure transmitting support member or push rod 50 is fixedly secured to the lower end portion of the rod 49 by a pair of bolts 51 and 52. As best shown in FIG. 4 the pressure transmitting member 50 is a hollow tube which is rigid and formed of metal to enable it to transmit pressure to the cylindrical balling band 53 which is connected at one of its sides to the lower end portion of the push rod 50. The balling band 53 may be of conventional construction or may be constructed in accordance with either of the balling bands disclosed in my prior Patent No. 2,964,860.

It will be noted that the axis of the shaft 49 is radially offset relative to the axis of the shaft 24. It will also be noted that the push rod 50 is capable of rotation about its longitudinal axis but is otherwise fixedly connected to the bracket member 41. Thus it will be seen that the elements 23–53 are all rigidly interconnected so as to be capable of transmitting downwardly directed pressure to the balling band 53 and thus cause the entrance of the latter into the soil as desired.

Referring now to FIG. 3 it will be seen that when the balling band 53 is resting upon the surface of the ground 54 as shown therein, the axis of the push rod 50 is vertical. When the pressure transmitting portion 22 of the arm 16 is elevated the axis of the push rod 50 will be slightly off vertical because of the offset disposition of its axis relative to the axis of the shaft 24 and the weight of the balling band and the hydraulic motor. When the pressure transmitting portion 22 of the rocker arm 16 is lowered, however, the balling band 53 may be swung to a position such that the axis of the push rod 50 extends vertically and the balling band 53 is disposed relative to the tree to be balled in such a relation that the tree is centered relative to the interior of the balling band.

In use the vehicle 5 is moved longitudinally of a row of trees which are to be dug and balled either by propelling the vehicle 5 itself or by drawing the same behind a vehicle such as the tractor 6. The vehicle 5 is halted relative to the particular tree to be dug so that the ballband 53 is immediately adjacent the same. The balling band is then swung about the longitudinal axis of the push rod 50 to the most desirable position so that the tree wil be centered relative to the balling band and the pressure transmitting portion 22 of the rocker arm is then lowered by transmitting hydraulic fluid into the lower portions of the cylinder 18 through the hydraulic line 21 through manipulation of the control lever 8. At the same time hydraulic fluid is transmitted to the hydraulic motor 36 through manipulation of the control lever 9 and this causes the drive pinion 40 to rotate and drive the ring gear 30 which in turn causes the disc 28 to rotate about the axis of the shaft 24. Rotation of the support disc 28 causes the bracket member 41 to turn with it and consequently the upper portion of the shaft 49 and the upper end portions of the push rod 50 are moved in a circle about the axis of the shaft 24. This revolving of the upper end portion of the push rod 50 about the axis of the shaft 24 causes the axis of the push rod 50 to be displaced relative to the vertical axis of the push rod and relative to a vertical line extending through the point at which the lower end of the push rod is connected to the balling band 53. Consequently, a rocking motion is imparted to the balling band 53 so that the ground piercing portions 55 which surround the open bottom of the balling band will be caused to pierce and enter the ground more easily as a direct consequence thereof. I have found that by providing this rocking motion to the balling band 53, substantially less power is required and the balling band may be inserted in substantially less time than is otherwise possible through the mere application of direct downward pressure as disclosed in my prior patent referred to above.

It will be noted that the driving of the support disc 28 through the ring gear 30 and the drive gear 40 plus the offset relation between the axis of the shaft 49 and the shaft 24 results in the shaft 49 being revolved around the axis of the shaft 24 and consequently the elements, 28, 30, 40 and 41 constitute revolver or rocker mechanism for the upper portions of the pressure-transmitting member or pusher rod 50. This revolving motion has the effect of applying maximum pressure to different areas alternately of the ground piercing portion 55 of the balling band and as a consequence the balling band can be inserted in the soil around the tree to complete the removal of the latter in a minimum of time and with a minimum of power requirements.

It should be noted that through the rotatable mounting of the shaft 49 it is possible to rotate the pressure-transmitting member 50 about its longitudinal axis and thereby enables the operator to swing the balling band 53 to a position either ahead or behind or to either side of the axis of the push rod 50. This provides a great degree of flexibility with respect to the digging of various trees which may have been displaced laterally relative to the row during the cultivating operation and enables the operator to dig and ball the tree with a minimum of damage therto since it is possible to center the tree relative to the balling band and thereby minimize damage to the roots.

In this conection, it will be recognized that the upright balling band 53 has a central vertical axis and that it is desirable wherever possible to center the tree upon this axis, thereby causing the soil penetrating portions 55 to cut the soil at points as far removed as possible from the tree whereby as few as possible of roots will be severed.

The bearings 25 and 48 which are utilized are standard wheel bearings which enables me to reduce the cost of my device to a minimum. It will be recognized that each of these bearings mount their respective shafts for rotation relative thereto about the longitudinal axis of the shaft.

In addition to the functional advantages pointed out hereinbefore, it should be noted that additional advantages are provided through the utilization of the rocker mechanism described hereinbefore which causes the support member 50 to be tilted or rocked so as to displace the longitudinal axis of the support member 50 off vertical. Since the rocking motion thereby accomplished causes the ground penetrating portions 55 to enter the soil more easily with consequent reduced power requirements, it is also possible to utilize much lighter construction throughout the entire tree balling device.

As a direct result, the mobile frame and the pressure transmitting mechanism may be of substantially lighter construction with a consequent saving in material and cost of manufacture as well as providing a device which can be moved through a field more easily because of its lighter weight. Because of its lighter weight and construction, when the pressure transmitting mechanism is mounted upon a trailer as shown in FIGS. 1 and 2, it can be utilized in conjunction with any tractor irrespective of its model or make. This is very important because if the pressure transmitting mechanism must be mounted directly upon the tractor, this can be accomplished only through specialized or customized mountings involving very substantial expenditures.

In addition to the fact that the utilization of the rocker mechanism makes it possible to utilize less power and a lighter vehicle in accomplishing the tree balling operation, this same rocker mechanism enables the balling band or bucket, as it is conventionally called in the trade, to penetrate more deeply and thereby makes it possible to dig and ball relatively deep rooted trees as compared to those which could be balled by devices heretofore known including my own prior tree balling device as disclosed and claimed in U.S. Patent No. 2,964,860. Consequently, through the adoption of this rocker mechanism I have expanded the utility of such a tree balling device substantially.

It will, of course, be understood that various changes may be made in the form, details, arrangement and proportions of the parts without departing from the scope of my invention which consists of the matter shown and described herein and set forth in the appended claims.

What is claimed is:

1. In a tree balling device:
   (a) a mobile frame,
   (b) a rocker arm pivotally mounted on said frame for rocking movement in a vertical plane about an axis extending transversely of said arm,
   (c) hydraulic drive means connected to said rocker arm and driving said rocker arm in a rocking motion about said axis,
   (d) said rocker arm having a thrust-transmitting portion for transmitting a downwardly directed thrust,
   (e) rigid universal coupling means connected to said thrust-transmitting portions of said rocker arm in thrust-transmitting relation,
   (f) a rigid rotary support member connected to said coupling means in supported and thrust-transmitting relation for rotation about a vertical axis,
   (g) rotary drive means connected to said rotary support member in driving relation to rotate the same about said axis of rotation,
   (h) an elongated rigid support member rotatably mounted upon said rotary support member for rotation about its longitudinal axis relative to said rotary support member,
   (i) said elongated rigid support member having upper portions mounted on said rotary support member in depending and thrust-transmitting relation at a point radially removed from said axis of rotation of said rotary support member and rotating with said rotary support member, and
   (j) a balling band mounted upon lower portions of said elongated support member and open at its bottom and having ground piercing portions thereat.

2. In a tree balling device:
   (a) a mobile frame,
   (b) a rocker arm pivotally mounted on said frame for rocking movement in a vertical plane about an axis extending transversely of said arm,
   (c) drive means connected to said rocker arm and driving said rocker arm in a rocking motion about said axis,
   (d) said rocker arm having a thrust-transmitting portion for transmitting a downwardly directed thrust,
   (e) rigid universal coupling means connected to said thrust-transmitting portions of said rocker arm in thrust-transmitting relation,
   (f) a rigid rotary support member rotatably connected to said coupling means in supported and thrust-transmitting relation for rotation about a vertical axis,
   (g) rotary drive means connected to said rotary support member in driving relation to rotate the same about said axis of rotation,
   (h) an elongated rigid support member having upper portions mounted on said rotary support member at a point radially removed from said axis of rotation of said rotary support member and in depending and thrust-transmitting relation and having upper portions rotating with said rotary support member, and
   (i) a balling band mounted upon lower portions of said elongated support member and open at its bottom and having ground piercing portions thereat.

3. The structure defined in claim 2 wherein said rotary support means includes a flat horizontally extending rotary disc and said rotary drive means is mounted on said coupling means and drivably engages the periphery of said disc.

4. The structure defined in claim 2 wherein said rocker arm extends transversely of said mobile frame.

5. In a tree balling device:
   (a) a mobile frame, (b) a rocker arm pivotally mounted on said frame for rocking movement in an upright plane about an axis extending transverly of said arm,
(c) powered drive means connected to said rocker arm in driving relation to cause the same to rock about said axis,
(d) an elongated rigid upright support member,
(e) a generally cylindrically shaped balling band secured to lower portions of said support member in supported and pressure-transmitting relation and having an open bottom with ground piercing portions thereat,
(f) said balling band being connected at its circumferential portions to said support member and extending laterally therefrom,
(g) universal coupling means connected to said rocker arm and rocking therewith,
(h) rotary support means connected to rocking portions of said rocker arm by said coupling means for rotation about a vertical axis,
(i) rotary drive means connected to said rotary support means in driving relation to rotate the same about said vertical axis,
(j) and bearing means mounted on said rotary support means and mounting upper portions of said upright support member thereupon is supported and depending pressure-transmitting relation,
(k) said upright support member being mounted in vertically non-aligned relation to the axis of rotation of said rotary support means and rotating with the latter about its axis of rotation,
(l) said upright support member being freely rotatable about its longitudinal axis within said bearing means whereby said balling band may be swung in a horizontal plane to various positions as desired about the longitudinal axis of said upright support member.

6. In a tree balling device:
(a) a mobile frame,
(b) a rocker arm pivotally mounted on said frame for rocking movement in an upright plant about an axis extending transversely of said arm,
(c) powered drive means connected to said rocker arm in driving relation to cause the same to rock about said axis,
(d) a rigid upright suport member,
(e) a balling band secured to lower portions of said support member in supported and pressure-transmitting relation and having an open bottom with ground piercing portions thereat,
(f) pressure-transmiting coupling means connected to said rocker arm and rocking therewith,
(g) rotary support means pivotally and rotatably connected to rocking portions of said rocker arm by said coupling means for pivotal movement therebetween and for roation about a vertical axis,
(h) rotary drive drive means connected to said rotary suport means in driving relation to rotate the same about said vertical axis,
(i) and means connecting upper portions of said upright support member to said rotary support means in supported and downward pressure-transmitting relation and in vertically non-aligned relation to the axis of rotation of said rotary support means for movement of said upper portions about the axis of said rotary support means.

7. In a tree balling device:
(a) a mobile frame,
(b) a rocker mounted on said frame for rocking movement thereof in an upright plane about an axis extending transversely of said rocker,
(c) a rigid upright support member,
(d) a balling band secured to lower portions of said support member in supported and pressure-transmitting relation and having an open bottom end with ground piercing portions thereat,
(e) pressure-transmitting coupling means connected to said rocker and rocking therewith, and connecting said upright supporting member with said rocker in force transmittting relation thereto and for rocking relative movement therebetween, and
(f) revolver mechanism connected to upper portions of said support member and rocking said upper portions about and in spaced changing relation to an upright axis extending through said lower portions of said support member and thereby rocking said ground piercing portions of said balling band relative to the ground to facilitate the ground piercing functions of said ground piercing portions.

8. In a tree balling device:
(a) a mobile frame,
(b) a rocker arm mounted on said frame for rocking movement thereof in an upright plane about an axis extending transversely of said rocker arm,
(c) a rigid upright support member,
(d) a balling band secured to lower portions of said support member in supported and pressure transmitting relation and having an open bottom end with ground piercing portions thereat,
(e) pressure-transmitting coupling means connected to said rocker arm and rocking therewith and
(f) power driven rocker mechanism interposed between said coupling means and upper portions of said support member and connecting the latter in force-transmitting relation with said coupling means and said rocker arm, supporting said support member upon said rocker arm for rocking movement therebetween,
(g) said rocker mechanism including mechanical means for rocking the upper portions of said support member in a generally horizontal plane and thereby rock said ground piercing portions of said balling band relative to the ground to facilitate the ground piercing functions of said ground piercing portions.

9. In a tree balling device:
(a) a mobile frame,
(b) pressure applying mechanism carried by said mobile frame and capable of exerting downwardly directed pressure,
(c) a balling band having an open bottom end with ground piercing portions thereat,
(d) a rigid upright support member rigidly secured to said band and in pressure-transmitting relation and extending upwardly therefrom,
(e) pressure-transmitting coupling means connecting said pressure applying mechanism with said support member in pressure-transmitting relation and supporting said member and said balling band on said mechanism for rocking movement therebetween, and
(f) power driven rocker mechanism eccentrically connecting to upper portions of said support member in rocking relation to said coupling means for rocking said upper portions about a vertical axis extending through lower portions of said support member to thereby facilitate the ground piercing functions of said band as downward pressure is applied to said band by said pressure applying mechanism and said support member.

10. The structure defined in claim 9 wherein said rocker mechanism is interposed between said coupling means and said support member and connects the two in pressure-transmitting relation.

11. In a tree balling device:
(a) a mobile frame,
(b) a rocker mounted on said frame for rocking movement about an axis extending generally horizontally, (c) a balling band open at its bottom end and having ground piercing portions thereat,
(d) a rigid upright support member having lower portions secured to said balling band, said support member extending upwardly from said balling band,
(e) mechanism connected to upper portions of said support member for causing said upper portions to rock about a vertical axis extending through said lower portions of said support member and thereby facilitate movement of said ground piercing portions of said balling band downwardly into the ground, and
(f) pressure-transmitting coupling means connecting said rocker with said mechanism for relative movement therebetween and in turn with said upright support member in downward force transmitting relation thereto for rocking relative movement between said rocker and said support member.

12. In a tree balling device:
(a) a mobile frame,
(b) an upright balling band open at its bottom end and having an upright central axis and having ground piercing portions thereat,
(c) pressure applying mechanism carried by said mobile frame and capable of exerting downwardly directed pressure,
(d) rockable pressure-transmitting means rockably connecting said balling band with said pressure applying mechanism in downwardly directed pressure receiving relation, and
(e) power driven rocker mechanism connected with said rockable pressure-transmitting means in rocking relation thereto and in rocking relation with said balling band for causing said balling band to rock about its said central axis so as to cause maximum pressure to be applied alternately to different areas of said ground piercing portions of said balling band as downward pressure is applied to said band by said pressure applying mechanism.

13. In a tree balling device:
(a) a mobile frame,
(b) pressure applying mechanism carried by said mobile frame and capable of exerting downwardly directed pressure,
(c) an upright balling band having an upright central axis and an open bottom end with ground piercing portions thereat,
(d) a rigid upright support member rigidly secured to said band in pressure-transmitting relation and extending upwardly therefrom and having an upright longitudinal axis,
(e) pressure-transmitting coupling means connecting said pressure applying mechanism with said support member in pressure-transmitting relation and supporting said member and said balling band on said mechanism for pivotal movement therebetween and for horizontal displacement of the upper portions of said support member, and
(f) support-member-moving mechanism connected to upper portions of said support member and displacing the longitudinal axis of said rigid upright support member as pressure is applied to said balling band by said upright support member and thereby causing maximum pressure to be applied alternately to different areas of said ground piercing portions of said balling band to facilitate the insertion of said portions into the ground.

14. The structure defined in claim 13 wherein said upright support member is constructed and arranged to be rotatable about its longitudinal axis in positioning said balling band relative to the tree to be dug and said balling band rotates therewith.

15. The structure defined in claim 13 wherein said pressure applying mechanism includes a rocker arm pivotally mounted on said frame and extending transversely thereof.

16. In a tree balling device:
(a) an upright rigid support member having a generally vertical longitudinal axis,
(b) a balling band secured to lower portions of said support member in supported and pressure-transmitting relation and having an open bottom end with ground piercing portions thereat,
(c) means connected to upper portions of said support member for exerting downwardly directed pressure thereupon and upon said balling band,
(d) pressure-transmitting mechanical means movably connecting the upper portions of said support member to said pressure exerting means for relative movement therebetween in a generally horizontal plane to permit said longitudinal axis of said support member to be displaced off vertical at the upper portions of said support member.

17. In a tree balling device:
(a) a mobile frame,
(b) pressure applying mechanism carried by said mobile frame and capable of exerting downwardly directed pressure,
(c) an upright balling band having an upright central axis and an open bottom end with ground piercing portions thereat,
(d) a rigid upright support member rigidly secured to said band in pressure-transmitting relation and extending upwardly therefrom and having an upright longitudinal axis,
(e) coupling means connecting said pressure applying mechanism with said support member in pressure-transmitting relation and pivotally supporting said member and said balling band on said mechanism for vertical movement of said balling band and revolvably supporting the upper portions of said support member for revolving movement thereof about its longitudinal axis, and
(f) support-member-moving mechanism connecting the upper portions of said support member with said mobile frame and capable of exerting downwardly tudinal axis of said rigid upright support member as pressure is applied to said balling band by said upright support member and thereby causing maximum pressure to be applied alternately to different areas of said ground piercing portions of said balling band to facilitate the insertion of said portions into the ground.

References Cited by the Examiner
UNITED STATES PATENTS

| | | | |
|---|---|---|---|
| 2,130,192 | 9/38 | Newsom | 175—325 |
| 2,775,428 | 12/56 | Monthan | 37—2 |
| 2,779,111 | 1/57 | Cartwright | 37—2 |
| 2,964,860 | 12/60 | Daniels | 37—2 |

BENJAMIN HERSH, *Primary Examiner.*

UNITED STATES PATENT OFFICE
CERTIFICATE OF CORRECTION

Patent No. 3,210,867 October 12, 1965

Franc P. Daniels, Jr.

It is hereby certified that error appears in the above numbered patent requiring correction and that the said Letters Patent should read as corrected below.

Column 7, lines 11 and 12, for "protions" read -- portions --; line 26, for "is" read -- in --; same column 7, line 57, strike out "drive", first occurrence; column 10, line 49, for "capable of exerting downwardly" read -- revolvably displacing the longi- --.

Signed and sealed this 17th day of May 1966.

(SEAL)
Attest:

ERNEST W. SWIDER
Attesting Officer

EDWARD J. BRENNER
Commissioner of Patents